US009831943B2

(12) United States Patent
Webb et al.

(10) Patent No.: US 9,831,943 B2
(45) Date of Patent: Nov. 28, 2017

(54) REPEATER OTDR USING REPEATER BASED RAMAN PUMPS

(71) Applicant: Xtera Communications, Inc., Allen, TX (US)

(72) Inventors: Stephen Michael Webb, Gravesend (GB); Wayne S. Pelouch, McKinney, TX (US); Do-Il Chang, Allen, TX (US); John G. Ellison, Colchester (GB)

(73) Assignee: Neptune Subsea IP Limited, London (GB)

( * ) Notice: Subject to any disclaimer, the term of this patent is extended or adjusted under 35 U.S.C. 154(b) by 0 days.

(21) Appl. No.: 14/109,735

(22) Filed: Dec. 17, 2013

(65) Prior Publication Data
US 2015/0171958 A1    Jun. 18, 2015

(51) Int. Cl.
| H04B 10/071 | (2013.01) |
| H04B 10/80 | (2013.01) |
| H04B 10/073 | (2013.01) |
| G01J 3/44 | (2006.01) |
| H01S 3/09 | (2006.01) |
| H04B 10/077 | (2013.01) |

(52) U.S. Cl.
CPC ....... *H04B 10/071* (2013.01); *H04B 10/0731* (2013.01); *H04B 10/0777* (2013.01); *H04B 10/80* (2013.01)

(58) Field of Classification Search
CPC ............. H04B 10/2916; H04B 10/2918; H04J 14/0221
USPC .................................................. 398/37, 25, 9
See application file for complete search history.

(56) References Cited

U.S. PATENT DOCUMENTS

| 5,396,569 | A | * | 3/1995 | Yanagawa | .......... | G01M 11/3136 |
| | | | | | | 250/227.15 |
| 5,528,404 | A | * | 6/1996 | MacKichan | ....... | G01M 11/3154 |
| | | | | | | 356/73.1 |
| 6,433,922 | B1 | * | 8/2002 | Ghera | ................ | H04B 10/2916 |
| | | | | | | 359/334 |
| 6,850,360 | B1 | | 2/2005 | Chen et al. | | |
| 7,019,894 | B1 | * | 3/2006 | Stentz | ................ | H04B 10/2942 |
| | | | | | | 359/341.41 |
| 8,054,455 | B2 | * | 11/2011 | Sugaya et al. | ................ | 356/73.1 |
| 8,111,453 | B2 | * | 2/2012 | Pelouch et al. | ................ | 359/334 |

(Continued)

FOREIGN PATENT DOCUMENTS

| EP | 1460737 | 9/2004 |
| WO | 93/02344 | 2/1993 |

OTHER PUBLICATIONS

PCT/US2014/069596, Notification of Transmittal of the International Search Report and the Written Opinion of the International Searching Authority, or Declaration dated May 18, 2015. (17 pages).

*Primary Examiner* — Oommen Jacob

(57) ABSTRACT

A submarine optical repeater includes a submarine amplifier module, which further includes a pumping laser module and an optical detector module. The pumping laser module generates optical amplifications within an optical cable, and, in the case of a fault in the optical cable, the optical detector module detects at least one characteristic of an optical signal caused by the fault in the optical cable. This configuration then identifies a particular signal characteristic that indicates a fault within the optical cable.

23 Claims, 7 Drawing Sheets

(56) References Cited

U.S. PATENT DOCUMENTS

| | | | |
|---|---|---|---|
| 2002/0121671 A1* | 9/2002 | Wakisaka | H01S 5/02276 257/467 |
| 2002/0140927 A1* | 10/2002 | Sobe | G01M 11/3145 356/73.1 |
| 2002/0159134 A1* | 10/2002 | Ghera | H04B 10/2916 359/334 |
| 2003/0161030 A1* | 8/2003 | Oh | H01S 3/06758 359/334 |
| 2006/0216038 A1* | 9/2006 | Yokota | H04B 10/0791 398/177 |
| 2008/0031638 A1* | 2/2008 | Nakamoto | H04B 10/693 398/202 |
| 2010/0195192 A1* | 8/2010 | Di Muro | 359/337.1 |
| 2010/0209110 A1* | 8/2010 | Pelouch et al. | 398/92 |
| 2011/0149271 A1* | 6/2011 | Woodward | G01M 11/3109 356/73.1 |
| 2012/0033293 A1* | 2/2012 | Zaacks | H01S 3/0014 359/341.3 |
| 2012/0182023 A1 | 7/2012 | Zhang et al. | |
| 2012/0224168 A1* | 9/2012 | Hirai | H04B 10/0791 356/73.1 |
| 2015/0171958 A1* | 6/2015 | Webb | H04B 10/071 398/37 |

* cited by examiner

REPEATER OTDR USING REPEATER BASED RAMAN PUMPS

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of tens, hundreds or even thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

At least one embodiment described herein relates to an optically pumped amplifier assembly that comprises a fiber fault detection module. The assembly includes an optically pumped amplifier that amplifies optical signals in a signal path. Furthermore, a sensor is located within the fiber fault detection module that can analyze an optical signal at the amplifier assembly. The fiber fault detection module is configured to determine that a fault exists within a fiber optical cable and to aid in determining the location of the fault.

In a first set of embodiments, this configuration is used with a submarine optical repeater assembly. The optical repeater assembly can include a submarine amplifier module, which comprises a pumping laser module and an optical detector module. The pumping laser module can generate optical amplifications within an optical cable, and the optical detector module can detect at least one characteristic of an optical signal caused by a fault in the optical cable. This configuration can then identify a particular signal characteristic that indicates a fault within the optical cable. Additionally, this configuration can provide information relating to the location of the fault.

In a second set of embodiments, the configuration is used for locating a fault within a submarine optic transmission system. In particular, a signal is transmitted to a submarine repeater located along a submarine optical transmission system. The transmitted communication can be structured to command the submarine optical repeater to gather data relating to a characterization of a fiber optic cable by issuing a line characterization signal on a fiber optical cable. The submarine optical repeater can then receive a reflection of the line characterization signal. The submarine optical repeater can send information relating to at least one characteristic of the reflection to a terminal.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a submarine optical amplifier assembly comprising an optical fiber fault detection module is described. The assembly can include an optically pumped amplifier that amplifies optical signals in a signal path. A sensor can be disposed within the fiber fault detection module. The sensor can analyze an optical signal at the amplifier assembly. The analyzed optical signal can provide information relating to the presence and location of a fault within the optical fiber.

A method for remote cable fault location can be beneficial in a Long haul optical transmission system in order to facilitate a repair. Conventionally, schemes have been based on remote measurement of light levels using telemetry, or cable end voltages in order to locate a fault. Such methods are somewhat limited to a resolution on the order of a cable span (40-80 km). By implanting an OTDR (optical time domain reflectometry) scheme within a repeater, the resolution accuracy of fault finding can greatly increase, saving cost and time during a cable repair operation.

Figure 1:
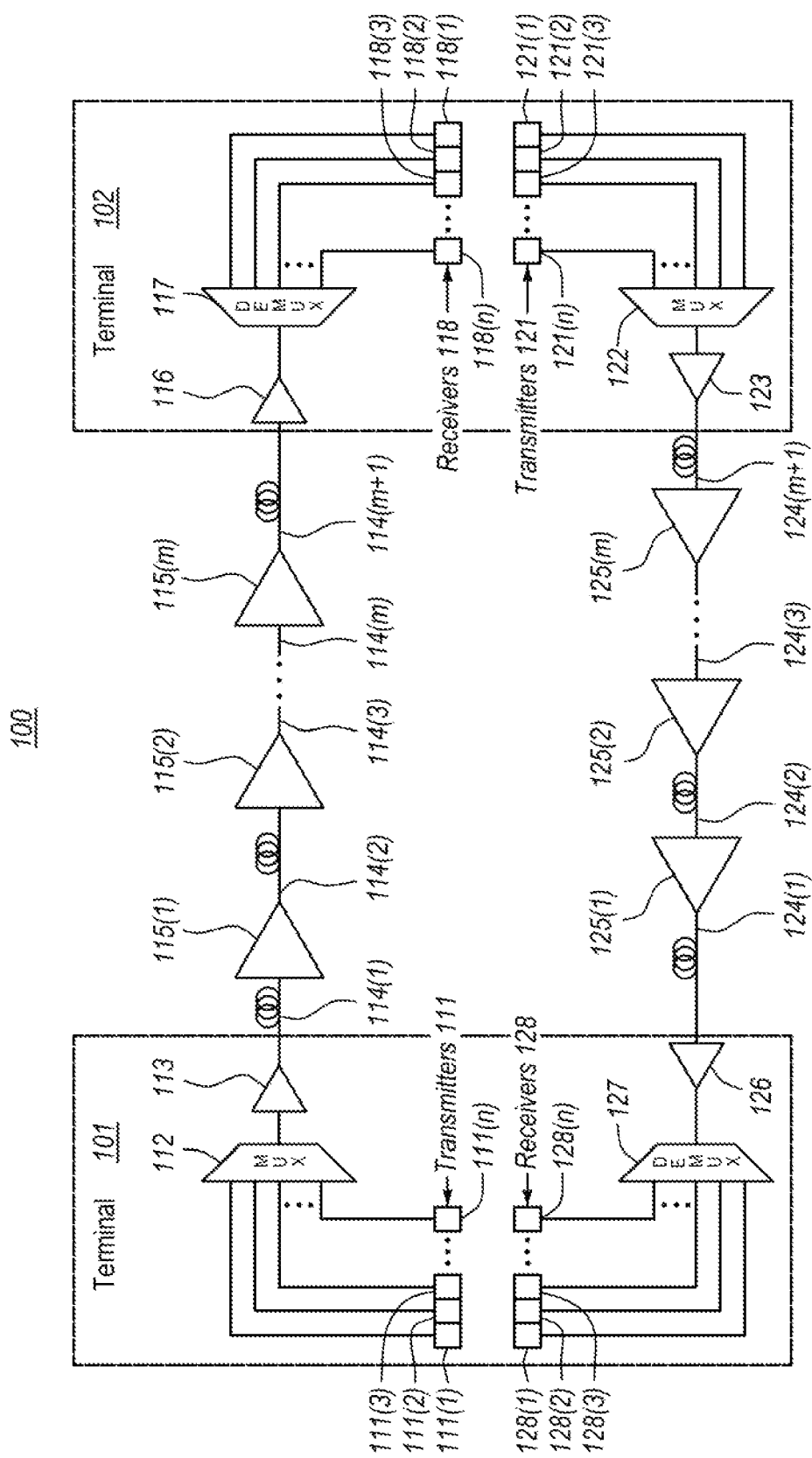
FIG. 1 schematically illustrates an example optical communications system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern" and travelling over an eastern link, whereas optical signals traveling from the terminal 102 to the terminal 101 will be referred to as being "western" and traveling over a western link. The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Signals that fall within the particular frequency will be referred to as respective optical wavelength signals. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern optical wavelength channel. Likewise, the terminal 102 may have "n" optical transmitters 121 including optical transmitters 121(1) through 121(n), each also for transmitting over a corresponding western optical wavelength channel.

The principles described herein are not limited, however, to communications in which the number of eastern optical wavelength channels is the same as the number of western optical wavelength channels. Furthermore, the principles described herein are not limited to the precise structure of the each of the optical transmitters. When implementing on optical transmitter, lasers are an appropriate optical transmitter for transmitting at a particular frequency. That said, the optical transmitters may each be multiple laser transmitters, and may be tunable within a frequency range.

As for the eastern link for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first optical fiber span 114(1).

There are a total of "m" repeaters (labeled 115 for the eastern repeaters and 125 for the western repeaters) and "m+1" optical fiber spans (labeled 114 for the eastern fiber link and 124 for the western fiber link) between the terminals 101 and 102 in each of the eastern and western links. However, there is no requirement for the number of repeaters in each of the eastern and western links to be equal. In an unrepeatered optical communications system, "m" would be zero such that there is but a single optical fiber span 114(1) and no repeaters between the terminals 101 and 102. In a repeatered optical communications system, "m" would be one or greater. Each of the repeaters, if present, may consume electrical power to thereby amplify the optical signals.

The eastern optical signal from the final optical fiber span 114(m+1) is then optionally amplified at the terminal 102 by an optional optical amplifier 116. The eastern optical signal is then demultiplexed into the various wavelength optical wavelength channels using optical demultiplexer 117. The various optical wavelength channels may then be received and processed by corresponding optical receivers 118 including optical receivers 118(1) through 118(n).

As for the western link for optical transmission in the western direction, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first optical fiber span 124(m+1). If the western optical channel is symmetric with the eastern optical channel, there are once again "m" repeaters 125 (labeled 125(1) through 125(m)), and "m+1" optical fiber spans 124 (labeled 124(1) through 124(m+1)). Recall that in an unrepeatered environment, "m" may be zero such that there is only one optical fiber span 124(1) and no repeaters 125 in the western link.

The western optical signal from the final optical fiber span 124(1) is then optionally amplified at the terminal 101 by the optional optical amplifier 126. The western optical signal is then demultiplexed using optical demultiplexer 127, whereupon the individual wavelength division optical channels are received and processed by the optical receivers 128 (including optical receivers 128(1) through 128(n)). Terminals 101 and/or 102 do not require all the elements shown in optical communications system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical span length between repeaters is approximately the same. The span distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical span length between repeaters (or from terminal to terminal in an unrepeatered system) for high-quality single mode fiber might be about 50 kilometers, and in practice may range from 30 kilometers or less to 100 kilometers or more. That said, the principles described herein are not limited to any particular optical span distances between repeaters, nor are they limited to repeater systems in which the optical span distances are the same from one repeatered segment to the next.

The optical communications system 100 is represented in simplified form for purpose of illustration and example only. The principles described herein may extend to much more complex optical communications systems. The principles described herein may apply to optical communication systems in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction.

Figure 2:
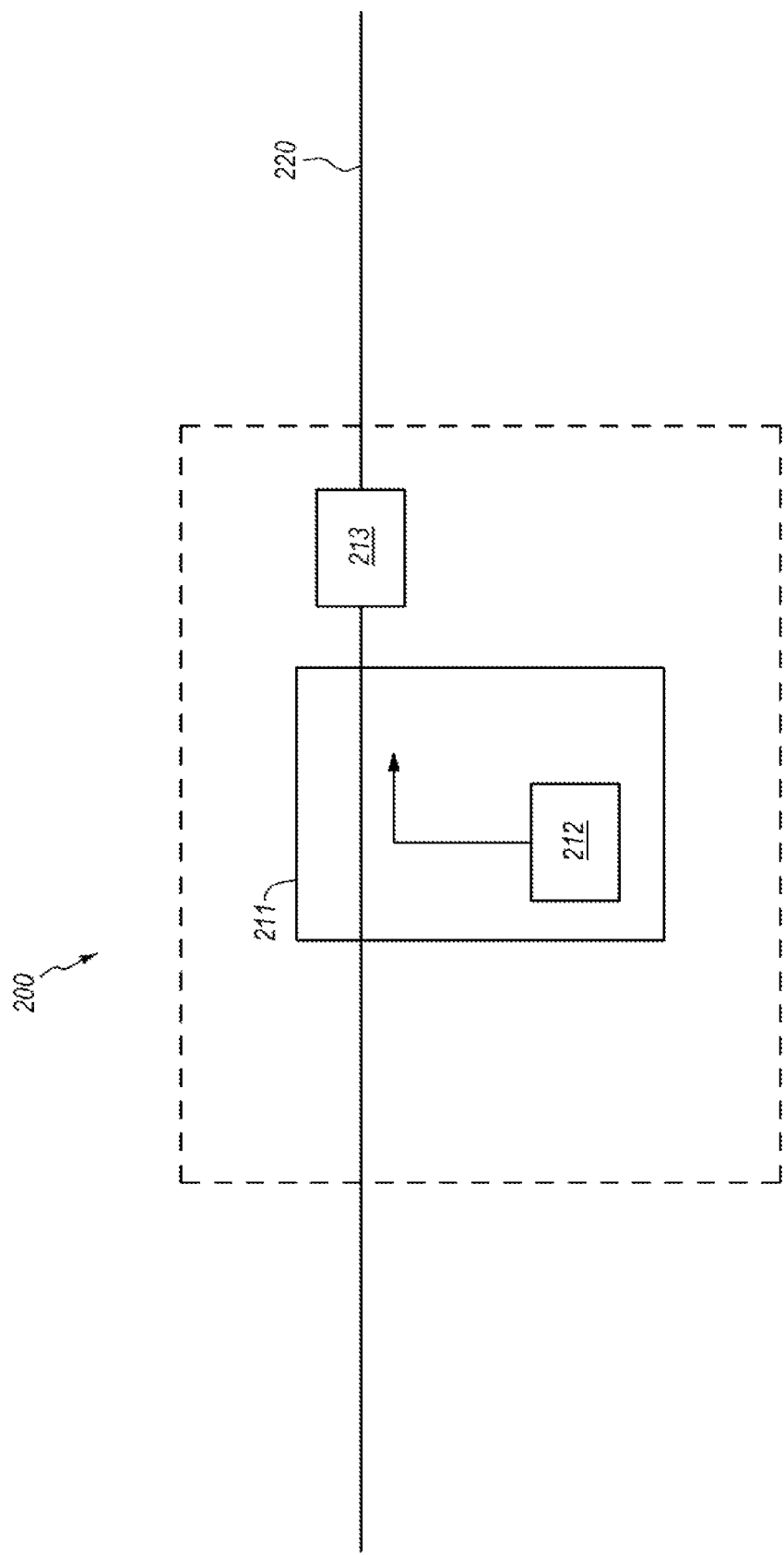
FIG. 2 illustrates an optical amplifier assembly that may exist in one of the repeaters of the optical communications system of FIG. 1, and which includes a repeater in the signal path.

FIG. 2 illustrates a submarine optical amplifier assembly 200. The optical repeater assembly may be used for amplification of any eastern optical signal of any fiber pair within any of the eastern repeaters 115 of FIG. 1, or may be used for amplification of any western optical signal of any fiber pair within any of the western repeaters 125 of FIG. 1. For any given fiber pair within any given repeater, there may be an instance of the submarine optical amplifier assembly 200 for each direction. Furthermore, for repeaters in which there are multiple fiber pairs, there may be two instances of the submarine optical amplifier assembly 200 for each optical fiber pair. Such may be true to one or more or all of the illustrated repeaters 115 and 125 of FIG. 1. Also, in FIG. 2 (and in subsequent FIGS. 3 through 5), the signal is illustrated as travelling leftward. This, of course, does not require that the signal itself be westerly.

The submarine optical amplifier assembly 200 receives optical signals from optical fiber 220 constituting one optical fiber span, amplifies the received optical signal, and then transmits the optical signal onto an optical fiber of the next fiber span. In particular, an amplifier module 211 within the submarine optical amplifier assembly 200 can perform the amplification function. The amplifier module 211 can comprise either an erbium amplifier, a Raman amplifier, or both. In the case of an erbium amplifier or a Raman amplifier, the amplifier module 211 also includes a pumping laser module 212 that is configured to generate optical amplification within an optical cable. Specifically, the pumping laser module 212 may comprise a 9xx nm laser for erbium-based amplification or a 14xx laser for Raman amplification.

The submarine optical amplifier assembly 200 also includes an optical detector module 213. The optical detector module 213 can detect at least one characteristic of an optical signal caused by a fault in the optical fiber 220. For example, an optical detector module 213 can include an optical time-domain reflectometer detector ("OTDR"), which detects optical reflections caused by faults within the optical fiber.

A more specific embodiment of the submarine optical amplifier assembly 200 will be described with respect to the submarine optical amplifier assembly 300 of FIG. 3. The submarine optical amplifier assembly 300 includes an amplifier module 311, which is an example of the submarine amplifier module 211 of FIG. 2, though the amplifier module 311 also integrates the functionality described for the optical detector module 213. Accordingly, when the term "module" is used herein, this is for convenience only to separate functions, and does not require any physical separation between one module and another.

Submarine optical amplifier assembly 300 also includes both a laser driver 323 and a 980 nm laser 331 for an erbium-based amplifier and a laser driver 322 and 14xx nm laser ("Raman pump") 312 for a Raman amplifier. In at least one embodiment, both amplifiers are useable either concurrently or individually. The submarine optical amplifier assembly 300 can also include an OTDR detector 313 and an associated amplifier 321, which together are an example of an optical detector module 213.

As previously mentioned, submarine optical amplifier assembly 300 includes a Raman amplifier and an erbium-based amplifier. The 14xx nm laser 312 and the associated laser driver 322 provide Raman pump power into the optical fiber 320 to thereby perform distributed Raman amplification of the optical signal in the optical fiber 320. In the case that the Raman laser is pumped in the direction that the signal is traveling, the Raman pump 312 is a forward Raman pump and the Raman pump power performs forward Raman amplification on the optical signal. In the case of the Raman laser is traveling against the signal, the Raman pump 312 is a backward Raman pump and the Raman pump power performs backward Raman amplification on the optical signal. In the example depicted in FIG. 3, the Raman pump 312 is a backward Raman pump because it is pumping against the flow of the signal sent from terminal 102.

Generally, Raman amplification is used to both improve noise figure and optical bandwidth, while Erbium amplification is used to boost the signal power efficiently. A microprocessor controller 314, or other circuit design, is used to control the pump powers for correct amplifier operation, as well as other general purpose functionality. While in practice a submarine optical amplifier assembly 300 may include additional elements, for simplification, some elements have been left out of the diagram (e.g., an output power detector).

The microprocessor controller 314 can cause the laser driver 322 to drive a short duration pulse on the 14xx nm laser 312. The generated short duration pulse can travel down optical fiber 320 towards terminal 102 (in the case of the submarine optical amplifier assembly 300 being within one of the repeaters 125) or towards terminal 101 (in the case of the submarine optical amplifier assembly 300 being within one of the repeaters 115). If the pulse encounters a fault, (e.g., a broken or pinched portion of the optical fiber 320) a reflection directed back towards the submarine optical amplifier assembly 300 will be caused by the short duration pulse's interaction with the fault. The microprocessor controller 314 can measure this reflection via an OTDR detector 313 and an amplifier 321. The amplifier 321 amplifies the reflected signal to be at a level that it can be read and analyzed by the microprocessor controller 314. Upon identifying a reflection, the microprocessor controller 314 can perform a simple time of flight correlation based upon the original short duration pulse and identify an approximate location of the fault within the optical fiber 320. Similarly, in at least one embodiment, the 14xx nm laser 312 can generate a pulse sequence (code). The flight time of the pulse sequence can then be estimated using correlation techniques to identify the location of a potential fault.

While the above example was described with respect to a Raman amplifier, in at least one embodiment, an erbium-based amplifier can be used. For example, the microprocessor controller 314 can cause laser driver 323 to drive the 980 nm laser 331 for a short pulse. One will understand that the 980 nm laser 331 is generally used for erbium-based amplification. Similar to that described above, the OTDR detector 313 can detect a reflection caused by the short duration pulse (from the 980 nm laser) interacting with a fault in the optic fiber 320. The detected reflection can be amplified by amplifier 321 and communicated to the microprocessor controller 314 for analysis. The microprocessor controller 314 can then perform a time of flight correlation based upon the original short duration pulse from the 980 nm laser 331 to determine an approximate location of the fault in the optical fiber 320.

Figure 3:
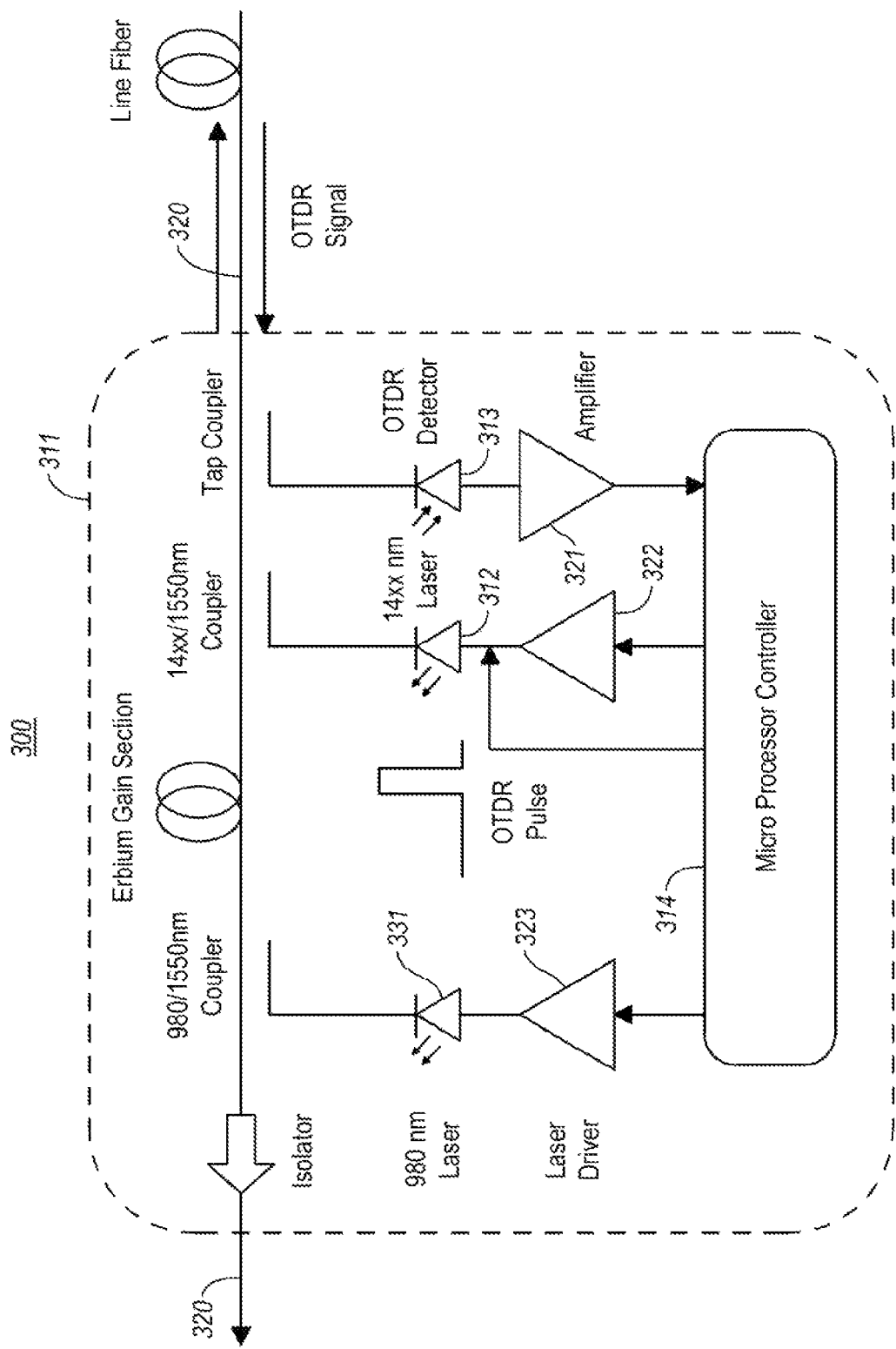
FIG. 3 illustrates a close-up configuration of the optical amplifier assembly of FIG. 2 and illustrates an Optical Time-Domain Reflectometer (OTDR) detector.
Figure 4:
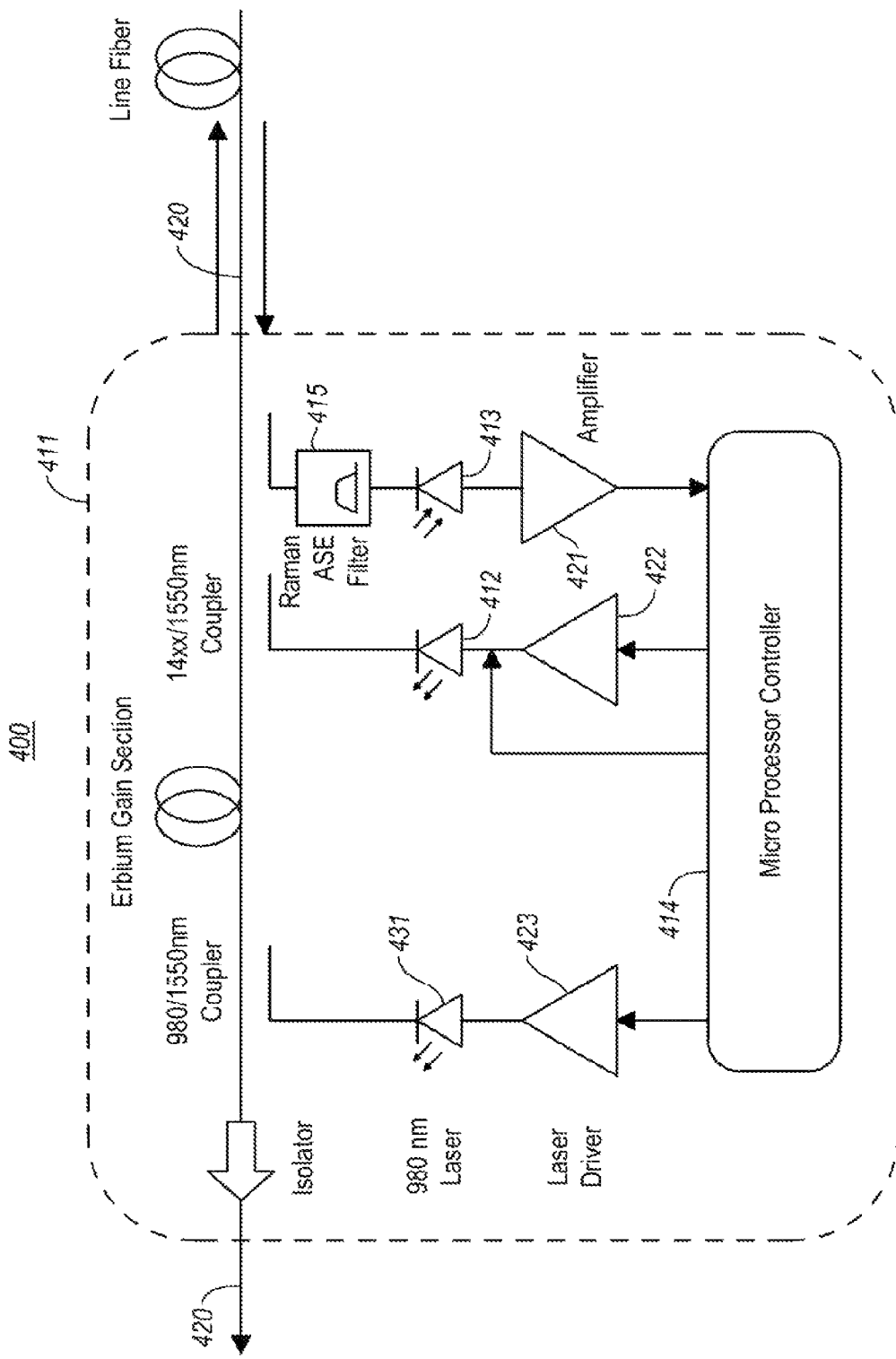
FIG. 4 illustrates another close-up configuration of the optical amplifier assembly of FIG. 2 and also includes an Amplified Spontaneous Emission (ASE) detector.

FIG. 4 depicts another embodiment of a submarine optical amplifier module 400, where instead of receiving and analyzing a reflected signal, an optical detector module (e.g., a photoreceptor) 415 receives signal information from an amplified spontaneous emission signal, which is generated by optical amplification within the optic fiber 420. Similar to FIG. 3, FIG. 4 depicts a submarine optical amplifier assembly 400, which includes an amplifier module 411. The submarine optical amplifier assembly 400 also includes a 14xx nm laser 412 and laser driver 422 (similar to 14xx nm laser 312 and laser driver 322 of FIG. 3) and a 980 nm laser 431 and laser driver 423 (similar to 980 nm laser 331 and laser driver 323 of FIG. 3).

As stated above, amplification within the optic fiber 420 can create amplified spontaneous emission ("A.S.E."). A.S.E. functions as broadband, multidirectional, unpolarized noise. The strength of A.S.E. is dependent upon a length of the amplifier that is generating the A.S.E. Accordingly, the submarine optical repeater assembly 400 can include a band pass filter 415 that is configured to pass through a particular portion of signal generated on the optic fiber 420. For example, the filter 415 may pass through a portion of that spectrum that primarily includes A.S.E. and does not include any data.

The photoreceptor 413 can detect and measure at least one characteristic of the A.S.E. signal (e.g., the signal power), which the amplifier 421 can then amplify and send to the microprocessor controller 414. Using the amplified and filtered A.S.E. signal, the microprocessor controller 414 can determine the approximate location of a fault in the optic fiber 420. In at least one embodiment, such a scheme may perform with increased precision because the photoreceptor 413 would be less likely to be corrupted by incidental back scatter from a Tap coupler port termination, for example, which can saturate the photoreceptor.

An example operation of the submarine optical amplifier assembly 300 of FIG. 3 will now be described with respect to FIG. 5, which illustrates a flowchart of a method 500 for locating a fault within a submarine optic transmission system. While the submarine optical amplifier assembly 300 of FIG. 3 is being described with respect to the flowchart of FIG. 5, one of ordinary skill in the art will understand, after having read this description, that the submarine optical amplifier assembly 400 of FIG. 4 could also include similar actions and steps, and accordingly much of the discussion will be analogous.

Figure 5:
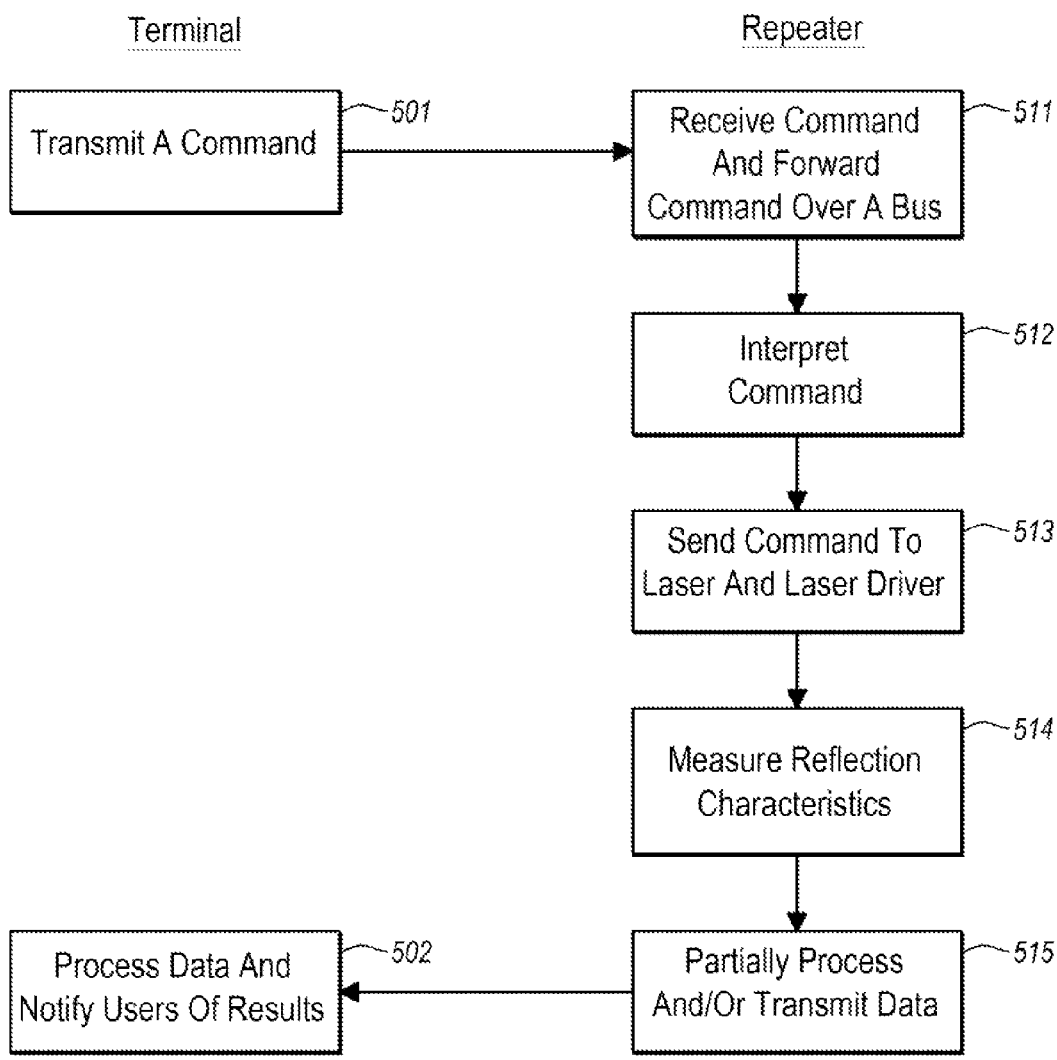
FIG. 5 illustrates a flow chart method for locating a fault within a submarine optic transmission system in accordance with at least one embodiment described herein.

In accordance with the method 500, some acts are performed by a terminal (such as terminal 101 of FIG. 1) and are thus listed in the left column of FIG. 5 under the heading "Terminal". Others of the acts of the method 500 are performed by a repeater (e.g., using the submarine optical amplifier assembly 300) and are thus listed in the right column of FIG. 5 under the heading "Repeater". That said, some of the acts described as being performed by the terminal may instead be performed by the repeater, and some of the acts described as being performed by the repeater may instead be performed by the terminal.

Referring back to FIG. 1, in accordance with the method 500, terminal 101 transmits a command instruction over a supervisory channel to a particular eastern repeater 115(*n*) (act 501 in FIG. 5), which instruction directs the eastern repeater 115(*n*) (where n is any integer from 1 to "m" where "m" is the number of eastern repeaters in the eastern link) to transmit a portion of the command instruction over a bus (act 511 in FIG. 5) to a western repeater 125(*n*) (in this example, the repeater that contains the submarine optical amplifier assembly 300 depicted in FIG. 3). Once the submarine optical amplifier assembly 300 receives the command, the microprocessor controller 314 interprets the command as directing the submarine optical amplifier assembly 300 to locate a fault in the optic fiber 320 (act 512 in FIG. 5).

Accordingly, the microprocessor controller 314 of FIG. 3 sends a command to both the laser driver 322 and the 14xx nm laser 312 (act 513 in FIG. 5) directing them to produce a line characterization signal (e.g., an OTDR pulse) on the optic fiber 320. In other embodiments, the line characterization signal can include other signals that can produce information relating to the fiber optic itself. For example, an amplification signal can produce A.S.E., which as described above can also be used to produce information relating to the fiber optic itself. Accordingly, in at least one embodiment, the line characterization signal can comprise a signal that produces A.S.E.

Once produced, the OTDR pulse travels down the optic fiber towards the terminal 102 and in a direction opposite the flow of data. In other embodiments, however, the Raman pump may be a forward amplifier, in which case the OTDR pulse would travel in the same direction as data flow and towards terminal 101. If the OTDR pulse encounters a fault within the optic fiber 320 an optical reflection would be generated. The optical reflection travels away from the fault and back towards the submarine optical amplifier assembly 300.

The OTDR detector 313 of FIG. 3 then measures characteristics of the reflection and sends the measured characteristics to the amplifier 321 for amplification (act 514 in FIG. 5). Measuring a characteristic can include measuring a signal's amplitude, frequency, phase, energy, travel time, combinations of the same, and so forth. For example, in at least one embodiment and as illustrated by FIG. 3, the OTDR detector 321 measures the strength of the reflected pulse and sends that measurement to the amplifier 321, which in turn sends an amplified measurement to microprocessor controller 314. Upon receiving the amplified measurement, the microprocessor controller 314 either partially processes the amplified measurement or transmits the amplified measurement to terminal 101 (act 515 in FIG. 5). The terminal 101 then performs further processing of the information and/or forwards the information to fiber optic managers (act 502). System communications, such as communications relating to line fault detection, between the submarine optical repeater assembly 300 and the terminal, can occur through normal data packet transfer along the optic fiber 320, or though a particular supervisory channel.

Whether processed completely or partially at the microprocessor controller 314 or processed completely at the terminal 101, the measured strength can be used to determine at least a proximate location of a fault within the optic fiber 320. For example, the measured strength can be integrated with respect to time and plotted as a function of fiber length. As such, the resulting graph shows the relative location of a fault within the fiber length. In some situations, multiple line characterization signals (e.g., OTDR pulses) and consequently multiple reflections samples may be used to increase the accuracy of the predicted location of the fault.

In an alternative embodiment (shown in FIG. 4), amplified spontaneous emission ("A.S.E.") can be used as a line characterization signal, instead of an OTDR pulse. Specifically, a photoreceptor (413 in FIG. 4) can be used to detect characteristics of a filtered A.S.E. signal. The detected characteristics can then communicate the characteristics through an amplifier (421 in FIG. 4) to a microprocessor controller (414 in FIG. 4), which calculate an approximate location of a fault within the optic fiber (320 in FIG. 3) based upon the detected characteristics.

Figure 6:
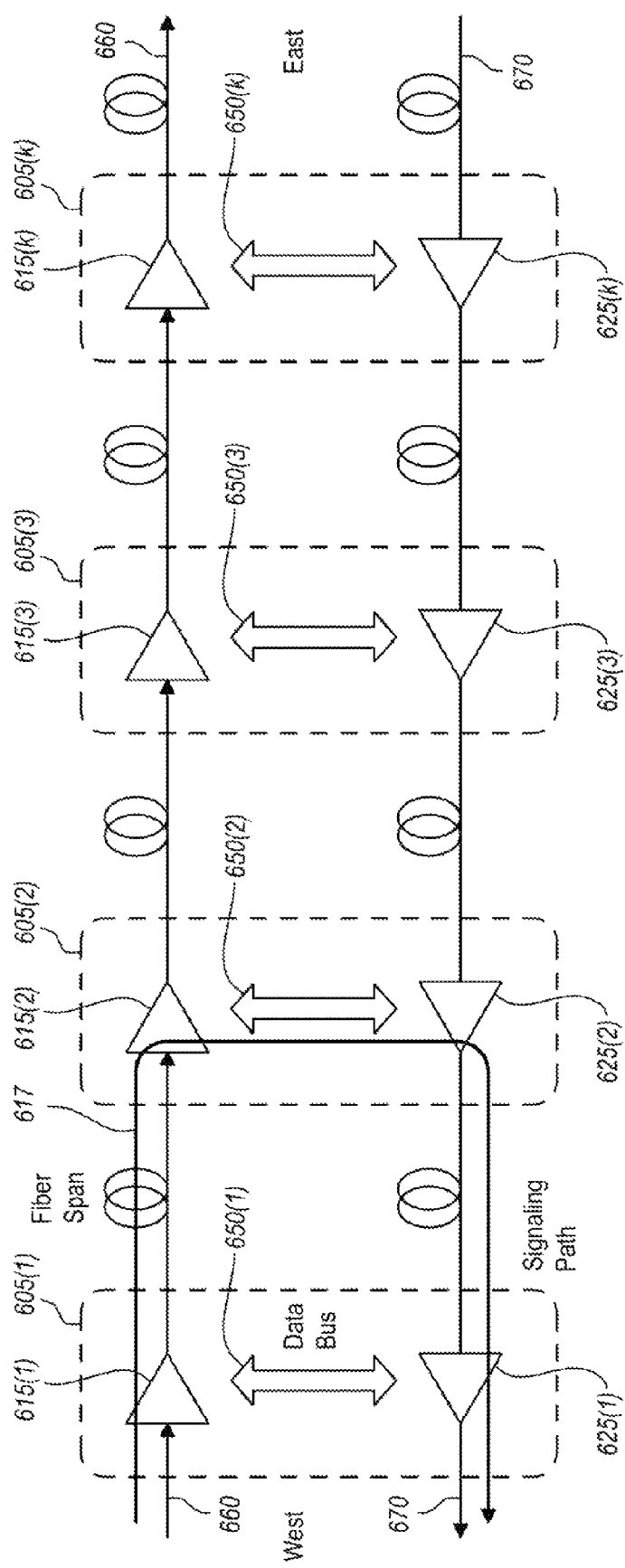
FIG. 6 shows a terminal addressing and communicating with a particular repeater.

FIG. 6 illustrates a typical submerged cable design with "k" repeaters 605(1) through 605(*k*) (where "k" is any positive integer two or greater) at periods down a cable length. Each repeater 605(1) through 605(*k*) has a corresponding eastern submarine optical amplifier assembly 615(1) through 615(*k*), and a corresponding western submarine optical amplifier assembly 625(1) through 625(*k*).

Overlaid in the design is a telemetry scheme that allows signaling to and from an individual optical amplifier from either terminal (101 and 102 in FIG. 1) in order that supervisory commands or resulting measurements may be performed. For any given repeater 605(1) through 605(*k*), there exists a corresponding internal data bus 650(1) through 650(*k*), so that any fiber may be accessed from any other fiber or direction east/west.

For example, suppose terminal 101 in FIG. 1 sends a communication towards terminal 102. In FIG. 6, in transit, this communication is referred to as communication 617 and is traveling towards repeater 605(2) (act 501 in FIG. 5). The communication 617 had traveled outbound from the terminal 101 along the eastern optic fiber 660 until the communication 617 reaches eastern submarine optical amplifier assembly 615(2), which is paired to western submarine optical amplifier assembly 625(2) by a bus 650(2). Eastern optical amplifier assembly 615(2) transmits the communication 617 to western optical amplifier assembly 625(2) over the bus 650(2) (act 511 in FIG. 5). Western optical amplifier assembly 625(2) can then execute any instructions contained within the communication 617 (act 512 in FIG. 5).

In at least one embodiment, the instructions may direct the western optical amplifier assembly 625(2) to issue a line characterization signal through an embedded laser and laser driver (act 513 in FIG. 5). The line characterization signal may encounter a fault within the fiber optic 670 and at least a portion of the line characterization signal may be reflected back towards the western optical amplifier assembly 625(2). In the depicted embodiment, however, the fiber optic 670 is in working condition and no line fault exists. Therefore, the western optical amplifier assembly 625(2) will not measure reflection characteristics (act 514) that represent a fault. In some embodiments, however, the western optical amplifier assembly 625(2) may detect negligible reflection characteristics that are a byproduct of the properties of the fiber optic 670 and do not represent an actual fault. In these cases, the western optical amplifier assembly 625(2) can distinguish the negligible, incidental reflection properties from those that indicate an actual fault. The western optical amplifier assembly 625(2) can then transmit this information to the terminal (terminal 101 in FIG. 1) (act 515 in FIG. 5). The terminal 101 in FIG. 1 then analyzes the received information and determines that no line fault exists (act 502 in FIG. 5).

Figure 7:
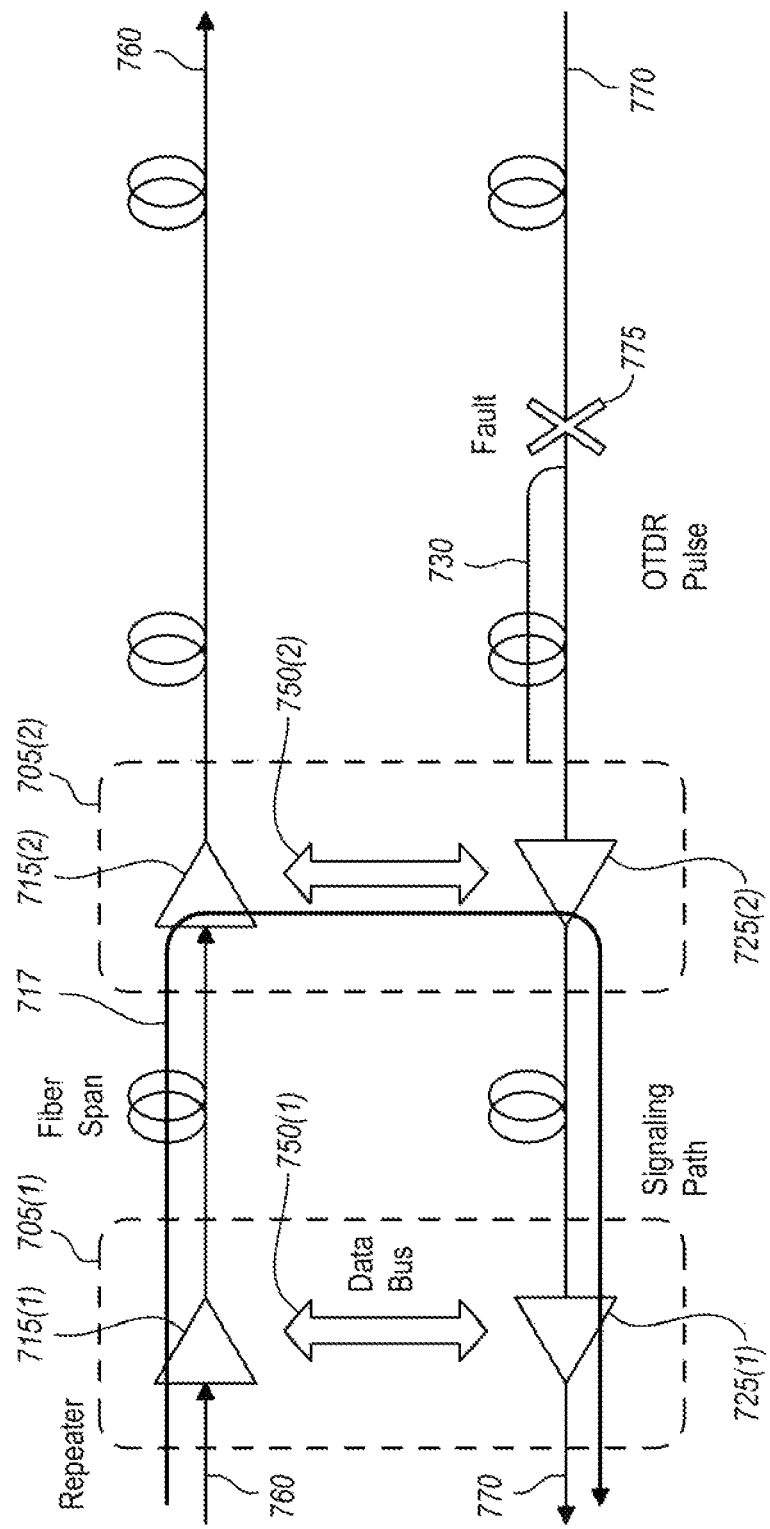
FIG. 7 shows a submarine repeater issuing a line characterization signal and detecting a fault.

FIG. 7 shows an example of the case in which terminal 101 in FIG. 1 sends out a command directing western optical amplifier assembly 725(2) to issue a line characterization signal 730 and to report back any results to the terminal 101. The communication 717 (sent by the terminal 101) travels along the eastern optic fiber 760 to eastern optical amplifier assembly 715(2) (act 501 in FIG. 5). Eastern optical amplifier assembly 715(2) is paired to western optical amplifier assembly 725(2) through bus 750(2). The optical amplifier assembly 715(2) uses the bus 750(2) to transmit the communication 717 to the western optical amplifier assembly 725(2) (act 511 in FIG. 5). Upon receiving the communication 717, the western optical amplifier assembly 725(2) executes the command and issues a line characterization signal 730, in this case an OTDR pulse (acts 512 and 513 in FIG. 5).

In FIG. 7, the Raman amplifier is a backwards amplifier. Accordingly, the OTDR pulse 730 is transmitted against the flow of data within the western optical cable 770. Traveling down the western optical cable, the OTDR pulse 730 encounters a fault 775 that causes a reflection to be generated back towards the western optical amplifier assembly 725(5). Characteristics of the reflected pulse are detected by an OTDR detector (313 in FIG. 3) within the western repeater 725(2) and then amplified by an amplifier (321 in FIG. 3) and sent to a microprocessor controller (314 in FIG. 3) for processing (act 514 in FIG. 7).

The microprocessor controller 314 can completely process the characteristics of the reflected pulse, partially process the characteristics of the reflected pulse and transmit the processed data to terminal 101 for further processing, or not process any of the characteristics of the reflected pulse and send the characteristics of the reflected pulse to terminal 101 for complete processing (acts 515 and 502 in FIG. 5). In any case, the distance between repeater 705(2) and the fault 775 can be calculated by the time of flight of the reflected pulse.

Also as mentioned above, sending multiple line characterization signals and averaging the results of each may provide greater certainty and precision in determining the location of the fault 775. Accordingly, in some embodiments, multiple line characterization signals may be issued, with each signal comprising different attributes. For example, individual line characterization signals 775 among the multiple line characterization signals may differ in duration, frequency, phase, polarity, amplitude, and other similar attributes. As multiple line characterization signals are issued, reflected at a fault 775, and analyzed, the microprocessor controller 314 and/or the terminal 101 can either jointly or individually analyze the multiple results to increase the resolution of the fault 775 location along the western optical cable 770. Additionally, the terminal 101 can store the analyzed data for later reference to determine if the western optical cable 770 has further degraded.

The principles described herein are not restricted to optical links in which Raman Amplification is available. For example, a 980 nm laser associated with Erbium amplification can be used to generate a line characterization signal, such as an OTDR pulse or to generate A.S.E. The principles described herein may be implemented regardless of the complexity of the optical channel connecting two terminals and regardless of the direction of amplification. For instance, the optical channel may be as simple as a single optical fiber with a single repeater. In such a case, the single repeater can receive a command from a terminal to issue a line characterization signal, issue the line characterization signal, and then communicate any resulting data to the eastern terminal.

Accordingly, a method for using a submarine optical repeater assembly to detect faults within an optical line has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A submarine optical repeater assembly comprising:
a submarine amplifier configured to be coupled to an optical cable and amplify optical signals, the submarine amplifier comprising:
a pumping laser configured to generate optical amplification within the optical cable wherein the pumping laser comprises a Raman amplifier pump;
an optical detector configured to detect at least one characteristic of an amplified spontaneous emission (ASE) generated within the optical cable; and
a controller configured to estimate a location of a fault in the optical cable based on the at least one characteristic of the ASE generated within the optical cable by estimating a distance between the submarine amplifier and the fault in the optical cable coupled to the submarine amplifier;
wherein the Raman amplifier pump is configured to generate the optical amplification within the optical cable and to generate a line characterization signal on the optical cable to create the ASE.

2. The submarine optical repeater assembly in accordance with claim 1, wherein the controller comprises a microprocessor.

3. The submarine optical repeater assembly in accordance with claim 1, wherein the optical detector further comprises an optical time-domain reflectometer detector configured to detect at least one characteristic of a reflected signal caused by the fault in the optical cable.

4. The submarine optical repeater assembly in accordance with claim 1, wherein the optical detector comprises a photoreceptor.

5. The submarine optical repeater assembly in accordance with claim 1, further comprising an amplifier configured to amplify the at least one characteristic of the ASE and provide the at least one amplified characteristic of the ASE to the controller.

6. The submarine optical repeater assembly in accordance with claim 1, wherein the pumping laser is further configured to generate an optical time-domain reflectometer pulse.

7. The submarine optical repeater assembly in accordance with claim 1, wherein the Raman amplifier pump comprises a laser configured to generate a laser output in a range from 1400 nm to 1499 nm.

8. The submarine optical repeater assembly in accordance with claim 1, further comprising an erbium fiber amplifier pump.

9. The submarine optical repeater assembly in accordance with claim 1, wherein the pumping laser comprises a laser configured to generate a laser output in a range from 900 nm to 999 nm.

10. The submarine optical repeater assembly in accordance with claim 1, wherein the pumping laser comprises the Raman amplifier pump and an Erbium amplifier fiber pump that are configured to be used and controlled both individually and concurrently.

11. The submarine optical repeater assembly in accordance with claim 1, further comprising a bandpass filter configured to substantially pass a portion of a spectrum that includes the ASE to the optical detector without including optical signals containing data being transported over the optical cable.

12. The submarine optical repeater assembly in accordance with claim 11, wherein the bandpass filter is configurable to pass-through a sample of the ASE to the optical detector.

13. The submarine optical repeater assembly in accordance with claim 1, wherein the optical detector is configured to measure a signal power of the ASE.

14. A method for locating a fault within a submarine optical transmission system, the method comprising:
transmitting a communication to a submarine repeater of the submarine optical transmission system, wherein the communication is structured such that, when interpreted by the submarine optical transmission system, the communication is taken as a command directing the submarine repeater to gather data regarding an optical fiber of the submarine optical transmission system coupled to the submarine repeater by issuing a line characterization signal on the optical fiber and detecting at least one characteristic of an amplified spontaneous emission (ASE) generated within the optical fiber;
receiving, from the submarine repeater, information relating to the at least one characteristic of the ASE generated within the optical fiber; and
estimating a location of a fault in the optical fiber based on the at least one characteristic of the ASE by estimating a distance between the submarine repeater and the fault in the optical fiber coupled to the submarine repeater;
wherein the line characterization signal is issued by a Raman amplifier.

15. The method in accordance with claim 14, further comprising receiving a reflection of another line characterization signal by an optical time-domain reflectometer.

16. A system for detecting faults within a submarine fiber optic cable, the system comprising:
a submarine repeater configured to be coupled to an optical cable of the submarine fiber optic cable and comprising:
a pumping laser configured to generate amplification within the optical cable, wherein the pumping laser comprises a Raman amplifier pump; and
an optical detector configured to measure at least one characteristic of an amplified spontaneous emission (ASE) generated within the optical cable; and
a controller configured to estimate a location of a fault in the optical cable based on the at least one characteristic of the ASE generated within the optical cable by estimating a distance between the submarine repeater and the fault in the optical cable coupled to the submarine repeater;
wherein the Raman amplifier pump is configured to generate the amplification within the optical cable and to generate a line characterization signal on the optical cable to create the ASE.

17. The system in accordance with claim 16, wherein the optical detector further comprises an optical time-domain reflectometer detector.

18. The system in accordance with claim 16, wherein the submarine repeater further comprises:
a bandpass filter configured to substantially pass a portion of a spectrum that includes the ASE to the optical detector without including optical signals containing data being transported over the optical cable.

19. The method in accordance with claim 14, wherein a strength of the ASE depends upon a functional length of the optical fiber coupled to the submarine repeater.

20. The system in accordance with claim 16, wherein the pumping laser comprises the Raman amplifier pump and an Erbium amplifier fiber pump that are configured to be used and controlled both individually and concurrently.

21. The system in accordance with claim 16, wherein the Raman amplifier pump comprises a laser configured to generate a laser output in a range from 1400 nm to 1499 nm.

22. The system in accordance with claim 16, wherein the optical detector is configured to measure a signal power of the ASE.

23. The method in accordance with claim 14, wherein the command directs the submarine repeater to use a bandpass filter to substantially pass a portion of a spectrum that includes the ASE to an optical detector without including optical signals containing data being transported over the optical fiber.

* * * * *